United States Patent [19]

Jones et al.

[11] 4,218,286

[45] Aug. 19, 1980

[54] PAPER HAVING GOOD ABSORBENCY AND ALKALI RESISTANCE AND METHOD OF MAKING SAID PAPER

[75] Inventors: Newlyn Jones, Berwick-upon-Tweed, England; Alistair C. Stewart, Newtonlea, Scotland

[73] Assignee: C. H. Dexter Limited, Great Britain

[21] Appl. No.: 963,452

[22] Filed: Nov. 24, 1978

Related U.S. Application Data

[63] Continuation-in-part of Ser. No. 809,118, Jun. 22, 1977, abandoned.

[51] Int. Cl.² .................... D21H 3/24; D21H 3/26; D21H 3/58
[52] U.S. Cl. .................... 162/164 R; 162/164 EP; 162/175; 162/177
[58] Field of Search .............. 162/164 EP, 164 R, 177, 162/175; 426/77, 84, 105, 135; 427/339; 138/118

[56] References Cited

U.S. PATENT DOCUMENTS

| | | | |
|---|---|---|---|
| 3,058,873 | 10/1962 | Keim et al. | 162/164 EP |
| 3,484,256 | 12/1969 | Chiu et al. | 162/164 EP |
| 3,935,320 | 1/1976 | Chiu et al. | 426/105 |

FOREIGN PATENT DOCUMENTS

| | | | |
|---|---|---|---|
| 1091105 | 11/1967 | United Kingdom | 162/164 R |
| 1111165 | 4/1978 | United Kingdom | 162/164 EP |

*Primary Examiner*—William F. Smith
*Attorney, Agent, or Firm*—Prutzman, Kalb, Chilton & Alix

[57] ABSTRACT

Fibrous paper webs of high water absorbency and improved alkaline wet tensile strength are obtained by treating the fibers prior to web formation or subsequent to web formation with aqueous solutions of a water-soluble thermosetting reaction product of a polyamide and an epichlorohydrin, a water-soluble nonviscose film-forming material such as hydroxy ethyl cellulose and a water-soluble polyethylene imine. The resultant absorbent sheet material maintains its absorbency upon aging, exhibits high wet caustic strength and can be used in the manufacture of tea bags or food casings.

16 Claims, No Drawings

PAPER HAVING GOOD ABSORBENCY AND ALKALI RESISTANCE AND METHOD OF MAKING SAID PAPER

RELATED APPLICATION

This application is a continuation-in-part of our copending application Ser. No. 809,118, filed June 22, 1977 now abandoned.

BACKGROUND AND SUMMARY OF THE INVENTION

The present invention relates to a process for the production of paper that exhibits a good alkaline wet strength and a good water absorbency, to the paper so produced and to products comprising such paper.

One field in which the present invention finds application is in the production of casing paper, which may be used for the manufacture of packaging for meat products such as sausage.

Casing paper is commonly manufactured from paper webs of relatively strong, high-tenacity natural fibres, such as abaca, siscal or flax. The paper web is saturated with a dilute viscose solution, for example a solution obtained by diluting a solution containing 7% by weight of cellulose (as cellulose xanthate) and 6% by weight of sodium hydroxide to a 1% cellulose content. The viscose-saturated web is dried and the cellulose in the viscose is then regenerated by passing the web through an acidic regenerating bath containing, for example, a 1–8% sulphuric acid solution. The web is then washed free of acid and dried to produce a paper web impregnated with acid-regenerated cellulose. This casing paper is then generally formed into rolls ("master rolls").

Casings for the packaging of processed meats, e.g. sausage, may be manufactured from the casing paper by cutting it into strips which are then folded to form tubes. The tubes are saturated with an alkaline viscose solution, containing, for example, 7% by weight of cellulose and 6% by weight of sodium hydroxide. The cellulose in the viscous is then regenerated by means of an acidic regenerating bath containing, for example, a dilute sulphuric acid and possibly such salts as sodium sulphate or ammonium sulphate. The tube is then passed through one or more baths in order to wash out the acid and the salts.

If desired, the tube may be passed through an aqueous bath which contains a plasticizer, e.g. glycerine, for the regenerated cellulose. The tube is dried by passing it through a heated chamber (the tube being in an inflated state) to give a cellulosic tubing which has embedded therein a paper web. This tubing may then be stuffed with a processed meat product under pressure. A process of this type is described in detail in U.S. Pat. No. 3,135,613.

The purpose in treating the initial paper web with dilute (1%) viscose solution, followed by regeneration, is to provide the web with strength and structural integrity so that it may withstand the treatment with the highly caustic viscose solution used in the formation of the casing tubes. The amount of acid-regenerated cellulose in the casing paper is, in fact, comparatively low; thus, the casing paper may have a typical basis weight (weight per unit area) of 20 grams/m$^2$, of which the acid-regenerated cellulose accounts for 0.6 g/m$^2$, compared with the material of the casing tubes which may have a typical basis weight of 70–80 g/m$^2$, of which 50–60 g/m$^2$ may be accounted for by the acid-regenerated cellulose. However, despite the initial treatment with viscose, the treatment with the highly caustic viscose solution used in the formation of the casing tubes will inevitably entail a certain degree of softening and weakening of the web. This imposes a limit on the production speeds if difficulty in handling the webs and possible breakdowns in production are to be avoided. There is accordingly a need in the art for casing paper having an improved alkali resistance in order to permit higher production speeds in the manufacture of the casing tubes.

In U.S. Pat. No. 3,378,379, there is disclosed a tubular regenerated-cellulose casing for dry sausage, which casing is provided with a coating comprising a cationic thermosetting resin bonded to the inside wall thereof. The patent suggests that polyethylene imine may also be employed for this coating, although this material is not, in fact, a thermosetting resin. The purpose of the inner coating is to improve the adhesion of the sausage casing to a dry product despite any shrinkage which may occur when the dry sausage product is processed and dried in the casing over a prolonged period of time. It should be noted, however, that in the aforesaid process it is not the casing paper as such which is treated with the thermosetting resin, but the tubular casing material. In the embodiment illustrated in U.S. Pat. No. 3,378,379, the cationic thermosetting resin is applied to the inner surface of the casing tube after the application of glycerine and before the casing is dried, in an inflated state, in a heated chamber.

Another problem recognized in U.S. Pat. No. 3,378,379 is the variation in extensibility in the transverse direction exhibited by casing paper strips cut out from different parts of the master oil. This can cause variation in the properties of the final casing tubes, which may therefore be unsatisfactory to the meat packager, for whom dimensional stability in the product is of commercial importance. To meet this problem, it is suggested in the aforesaid U.S. patent that a cationic thermosetting resin (e.g., a reaction product of epichlorohydrin and a polyamide, a modified melamine-formaldehyde resin or a modified urea-formaldehyde resin) may be employed as the bonding agent in the casing paper, instead of the commonly employed acid-regenerated viscose. The cationic thermosetting resin is employed in an amount of at least 0.5% by weight based upon the dry weight of the impregnated fibrous web. The resin may be incorporated into the fibrous web by adding the resin to the fibrous slurry prior to forming the fibrous web. Alternatively, the formed fibrous web may be impregnated with the resin by passage through an aqueous solution of said resin. The said U.S. patent also discloses the use of the thermosetting resin in combination with viscose which is not regenerated with an acid; however, in the latter case the viscose may be auto-regenerated by storing the web for a sufficient period.

U.S. Pat. No. 3,484,256 discloses a process for the production of casing paper, in which a fibrous web is bonded with a cationic thermosetting resin, and a polyacrylamide resin. An interesting point is that in Table III of that patent, there is a comparison of the tensile strengths, under various conditions (dry, wet and 6% aqueous NaOH), of paper webs that are bonded with regenerated viscous or with polyamide-epichlorohydrin resin and polyacrylamide or with just polyamideepichlorohydrin resin. The results might at first suggest that the alkaline wet strength of the web bonded with just polyamide-epichlorohydrin resin is at least as good as that of the viscose-bonded web. However, these results required careful qualification since the alkaline wet strength decreases as caustic solution soak time increases. In this connection, casing manufacture typically involves caustic soak times of at least five minutes and, more likely, twenty minutes.

In United Kingdom Patent Specification No. 1,091,105, there is described a process in which casing paper is produced by incorporating into a paper web an alkaline-curing resin such as polyethylene imine or a polymeric reaction product of epichlorohydrin and a polyamide. The use of the alkaline-curing resin in place of the customary treatment with dilute viscose is said to result in a casing paper which has more uniform characteristics across its width and which results in a casing having improved burst strengths. However, it has since been found that the casing paper so produced has an alkali resistance which is insufficient to permit sufficiently high production speeds for the commercial manufacture of the casing tubes.

In general, the alkali resistance of regenerated viscose casing paper is merely adequate; this means that in order to avoid numerous breaks in the web on the manufacturing equipment, the operation speeds must be limited. It has also been found that the absorbency of viscose-treated casing paper webs deteriorates with aging. This will also serve to restrict the rate of production of the casing tubes; it is not uncommon for a period of three months or more to elapse between the manufacture of the casing paper and its subsequent use.

Another field in which the present invention finds application is in the production of paper for the manufacture of infusion pouches, for example tea bags and spice bags.

Tea bags and the like are commonly formed as pouches of a material ("tea bag paper") that is permeable to water and to the beverage formed by infusion, i.e. by the dissolution of soluble solids in the contents of the pouch, upon the application of hot water thereto. Desirable characteristics of the material are cleanliness, good absorbency, high wet strength, a sheet structure to permit rapid diffusion of the tea extract, and ability to perform satisfactorily in high-speed packaging equipment with which the tea bags are fabricated and filled. The strength of the pouch is determined, by and large, by three main factors: firstly, the fibre composition of the paper and the chemical treatments, if any, that the paper has undergone; secondly, the nature of the contents (e.g. tea) of the pouch; and thirdly, the interaction, if any, between the solids dissolved during the infusion and the chemicals with which the paper fibres have been treated.

Hitherto, the chemical treatment of fibrous webs for tea bag paper has, in general, been effected by either of two methods. In the first method, the fibrous sheet is saturated with viscose and the cellulose in the viscose is then regenerated with a dilute acid. This method produces a fibrous web with an adequate strength in aqueous alkaline conditions. However, the product has a disadvantage, in that it can impart an undesirable taste to tea or other beverages.

The second method comprises saturating the fibrous sheet with a mixture of a polyamide-epichlorohydrin resin and carboxy methyl cellulose, as described, for instance, in U.K. Patent Specification No. 1,111,165. This method produces a fibrous web which is somewhat weaker in alkaline, aqueous media than the fibrous webs produced by the first method. This product, however, is neutral as regards taste.

The drawbacks of these prior art methods are particularly noticeable when the papers are used for the production of herbal tea bags; herbal teas are alkaline. Thus the viscose-treated paper can be formed into a bag having an adequate alkaline wet strength, but which gives rise to a beverage of poor taste or flavour. On the other hand, the other type of paper will not affect the taste of the beverage, but the tea bags formed therefrom will have a low alkaline wet strength.

Mention should also be made of U.S. Pat. No. 2,698,793 which discloses a process for producing a sized cellulosic sheet having resistance to water and ink. A water-insoluble, hydrophobic sizing agent, in the form of a water-dispersible salt, and an alkyleneimine resin are added separately to an aqueous suspension of the cellulosic fibres, which suspension is allowed to stand after each addition, and the fibres are subsequently formed into a sheet. The sheet is then heated to 105° to 150° C. to develop the sizing properties of the sizing agent. Additionally, other sizing or filling agents, e.g. starch, can also be employed.

The said U.S. patent, it should be stressed, is concerned with giving the sheet a resistance to water by rendering it water-repellent. Thus, water and water-based inks are prevented from penetrating the interstices of the paper by the increased surface tension at the surfaces of the paper matrix. It should be noted that the sizing agents specified in U.S. Pat. No. 2,698,793 must be water-insoluble, hydrophobic compounds. The "wet strength" exhibited by the sheets treated in accordance with the process of the said U.S. patent is attributable primarily to the fact that the fibres remain in a dry state below the water-repellent surface of the matrix. It has, in fact, been known for a long time that water-resistance can be imparted to paper webs by treatment with chemicals such as rosin size. However, once water has been driven into the interstices of the web, either by mechanical forces or by use of surfactants, the apparent wet strength of the sheets would be lost.

In contrast, the present invention is directed to the very different problem of producing a paper web that has alkaline wet strength (a property with which U.S. Pat. No. 2,698,793 is not concerned) yet at the same time is absorbent. Clearly, a water-repellency mechanism, as employed in U.S. Pat. No. 2,698,793, would be of no use in the field of casing papers and tea bag papers: the former are required to absorb aqueous viscose solutions and the latter must not present any impediments to the passage of water and of the aqueous infusion.

It is an object of the present invention to provide a process for the production of paper having a good alkaline wet strength and a good absorbency.

It is a further object to provide such a process whereby casing paper can be produced which retains its absorbency even after aging, thus permitting casing tubes to be produced using high-speed commercial processes.

It is another object of the present invention to provide a process whereby tea bag paper can be produced that combines taste neutrality with a good alkaline wet strength whilst retaining a good absorbency.

It is yet a further object to provide such processes that avoid the use of viscose and its consequent acid regeneration.

Other objects will be in part obvious and in part pointed out more in detail hereinafter.

According to the present invention, a process for the production of paper comprises forming a fibrous paper web and treating the fibres with a water-soluble cationic, thermosetting, epihalohydrin-containing resin, a nonviscose film-forming material and a polyalkylene imine.

The present invention also provides paper, for example casing paper and tea bag paper, when prepared by the aforesaid process.

The invention also provides casing material (casing tubes or skins) prepared from the said casing paper by a process comprising the application of a caustic viscose solution and subsequent acid regeneration, as well as infusion pouches, e.g. tea bags (especially herbal tea bags) and spice bags, manufactured from the said tea bag paper.

A better understanding of this invention will be obtained from the following description of the process including the several steps and the relation of one or more of such steps with respect to each of the others and the article of manufacture possessing the features, characteristics, compositions, properties and relation of elements described and exemplified herein.

DESCRIPTION OF A PREFERRED EMBODIMENT

It will be appreciated that the invention lies in the selection of the three specified treating agents; these have been found capable of acting in an unexpected, synergistic manner to impart an excellent alkaline wet strength and good absorbency to paper webs.

The fibrous web may be formed by papermaking techniques that are conventional in the art. The choice of the actual method and indeed of the composition of the fibres will depend upon the intended use of the paper.

For example, the fibrous webs used in making casing paper are conventionally composed of natural vegetable fibres of pure cellulose and are preferably composed of long lightweight nonhydrated fibres of the Musa type, particularly hemp fibres of the Manila or abaca hemp variety. Webs made from this material are generally soft porous papers of uniform texture and thickness and have for some time found wide acceptance as the primary fibre component of the fibrous base webs used in casing manufacture.

In the case of tea bag paper, a preferred fibrous material is a lightweight permeable paper made from any of abaca pulp, sisal pulp, regenerated rayon, espartograss pulp and long-fibred chemical wood pulp. Of course, in order to permit the fabrication of a heat-sealed pouch, the fibrous metal may comprise heat-sealable fibres of such materials as polyolefins, e.g. polyethylene or polypropylene, or viny chloride and vinyl acetate polymers. The basis weight of the paper of the invention is usually from 8 to 12 pounds (24×36—480).

It should be noted that the three treating agents—namely the water-soluble, cationic, thermosetting, epihalohydrin-containing resin, the nonviscose film-forming material and the polyalkylene imine—may be applied to the fibres at any stage of the paper-making process, even prior to the formation of the web, e.g. they may be added to the fibre slurry. However, the said agents are preferably applied to the fibres after the formation of the fibrous web or sheet. Preferably, the three treating agents are applied simultaneously; this can be effected conveniently by passing the fibrous web through an aqueous bath containing all three agents, or by spraying the agents on the web.

Preferably, the water-soluble, cationic, thermosetting resin is an epichlorohydrin-containing resin.

A preferred class of cationic, thermosetting resins are the water-soluble polyamide-epichlorohydrin resins (PAE), such as those prepared by the reaction of epichlorohydrin with polyamides derived from polyalkylene polyamides (e.g. diethylene triamine or tetra-ethylene pentamine) and saturated or unsaturated aliphatic or aromatic polycarboxylic acid containing 3 to 10 carbon atoms (e.g. adipic, itaconic, or succinic acic). Resins of this type are described in U.S. Pat. No. 2,926,116, No. 2,926,154 and No. 3,125,552.

In U.S. Pat. No. 3,535,288, there are disclosed suitable resins that are derived from epichlorohydrin and polyamides that are the reaction products of certain amino polycarboxylates and derivatives thereof, especially ethylene-diamine-tetraacetic acid or diethylenetriamine pentaacetic acid, and polyalkylene polyamides, especially pentaethylenehexamine.

Suitable polyamide-epichlorohydrin resins are also disclosed in U.S. Pat. No. 3,526,608. Here the polyamides are obtained from the reaction of polyalkylene polyamines, and either iminodiacetic acid, N,N'-piperazinediacetic acid, N-alkyliminodiacetic acids, N,N'-dialkylethylenediamine-N,N'-diacetic acids, or their corresponding lower alkyl esters. Preferred polyalkylene polyamines are diethylenetriamine, triethylenetetramine, and tetraethylenepentamine and mixtures of these polyamines.

The resins disclosed in U.S. Pat. No. 3,565,754 are provided by reacting epichlorohydrin with polyamides derived from nitrilotriacetic acid and polyalkylene polyamines containing two primary amine groups and at least one secondary amine group in which the nitrogen atoms are linked together by groups having the formula —$C_nH_{2n}$— where n is a small integer generally having a value of 2 and the number of such groups in the molecule ranges from 2 to 19 and preferably up to 6. The nitrogen atoms may be attached to adjacent carbon atoms in the group —$C_nH_{2n}$— or to carbon atoms further apart, but not to the same carbon atom.

As disclosed in U.S. Pat. No. 3,816,556, water-soluble, cationic, thermosetting polyamide-epichlorohydrin resins can be converted into polysalts by reaction with certain anionic, water-soluble polyacrylamides. Such polysalts are useful in this invention.

Other epichlorohydrin-containing resins which can be used include the reaction products of epichlorohydrin with polymers derived from polyacrylamide and polyamines such as ethylenediamine (U.S. Pat. No. 3,507,857); with hydrolysed polyvinylimidazoline (U.S. Pat. No. 3,640,936); with polyamine-polyamide polymers derived from certain hetercyclic dicarboxylic acids, aminocarbonyl compounds, di- or polyalkylene polyamines and epichlorohydrin (U.S. Pat. No. 3,761,350); and with polyethyleneimine (U.S. Pat. No. 3,520,774).

The water-soluble, cationic, thermosetting epihalohydrin-containing resin is usually applied in an amount to give 0.05% to 4%, by weight of the fibrous web, on a dry weight basis. For casing paper, the preferred amount is 0.3% to 4%, especially 1.0% to 2.5%. For tea bag paper the preferred amount is 0.05% to 1%, especially 0.1% to 0.5%.

The nonviscose film-forming material is preferably a water soluble polymer derived from cellulose and containing a hydroxyl group, such as a water soluble cellulose ether. Within this group the preferred film-forming material is hydroxy ethyl cellulose (HEC), although other cellulose derivatives, such as methyl cellulose, hydroxy propyl cellulose, and sodium carboxymethyl cellulose (CMC), could be used. Other film-forming agents containing a hydroxyl group include polyvinyl alcohol, starch, starch derivatives, natural gums and other water-soluble polymers. The preferred material is nonionic and its solutions are unaffected by cations. It dissolves readily in either hot or cold water and exhibits a high degree of substitution; that is, it has a mole substituent level of two or more and preferably about 2.5. Typical of the preferred hydroxy-ethyl cellulose used in the invention is the nonionic material sold by Hercules, Inc. under the trademark "Natrosol 250". This material rapidly dissolves in water to form a clear, smooth uniform solution that will not gel even when heated to 100° C. and exhibits a pH of about 7. The viscosity of the material will vary with molecular weight with the lower molecular weight material exhibiting less change in viscosity as stress conditions vary. Materials of widely varying viscosities have been used with good results.

The nonviscose, nonionic film-forming material is usually applied in an amount to give 0.05% to 8%, by weight of the fibrous web, on a dry weight basis. For casing paper, the preferred amount is 0.25% to 8%, especially 0.5% to 5.0%. For tea bag paper, the preferred amount is 0.1% to 5%, especially 0.3% to 3.0%.

Polyalkylene imine is known in the paper-making art as a retention aid to prevent fibers passing through the paper-making wire. It has also been suggested for use in certain specialty papers where it may slightly increase the wet strength. The preferred polyalkylene imine resin is polyethylene imine (PEI) which may be synthesized by acid-catalyzed polymerization of the monomer ethyleneimine. The resin can be used as either a homopolymer or copolymer with materials such as acrylamides and is a highly branched polymer that can vary in molecular weight from only about a few thousand up to about 100,000 or more. The preferred PEI is a water soluble, cationic, homopolymeric, nonthermosetting resin having a molecular weight of greater than 10,000 and preferably between about 30,000 and 60,000. PEI is a positively charged cationic resin with its charge density increasing as its normally alkaline solution is acidified. A typical example of the homopolymer is the material sold as "Polymin P" by BASF of Germany. The copolymer may have a slightly lower molecular weight, such as the material "Polymin SN" having molecular weight of 22,000.

The polyalkylene imine is usually applied in an amount to give 0.05% to 2.0%, by weight of the fibrous web, on a dry weight basis. This range is entirely suitable for casing paper, although the preferred amount in 0.1% to 0.8%. For tea bag paper, the amount is typically smaller with the preferred amount being 0.05% to 1.0%, especially 0.1% to 0.8%.

Prior to its impregnation with a caustic viscose solution or the like in order to form the final casing material, the casing paper of the present invention may be treated in order to improve its absorbency yet further. One preferred method is to subject at least one side of the web to a corona discharge treatment at an energy density of at least 0.5 Watt/min/ft$^2$ of web surface. The usual level will exceed 1.5 Watt-min/ft$^2$ and is preferably 5 to 40 Watt-min/ft$^2$.

The following examples are given in order that the effectiveness of the present invention may be more fully understood. These examples are set forth for the purpose of illustration only and are not intended in any way to limit the practice of the invention. Unless otherwise specified, all parts are given by weight.

EXAMPLE 1

A quantity of casing fibrous sheets was manufactured without any chemical treatment. Various blends of the chemical combinations containing Kymene 557 (trade name of a water-soluble, polyamideepichlorohydrin resin marketed by Hercules Powder Company), Polymin P (trade name of a polyethyleneimine marketed by BASF, Germany) and Natrasol 250L (trade name of a commercially available hydroxy ethyl cellulose) were applied to the untreated sheet by means of a laboratory size-press to provide a total chemical pick up of about 1.6% by weight of the fibrous web on a dry weight basis.

A standard viscose-treated sheet was also manufactured on a pilot-scale paper-making machine for use as a standard. The sheets where then tested for alkaline tensile strength and absorbency. Eventually a suitable combination (Formulation A) was accepted for a full-scale production run.

This run was made by applying the chemical mixture by means of a size-press unit which was immediately followed by a drying apparatus consisting of a series of steam filled cylinders.

A second production run was also made where the Polymin P concentration was reduced by 50% in the chemical mixture (Formulation B).

The resultant sheets were then tested and the results compared with those obtained with the standard casing sheet. The alkaline resistance was measured by recording the tensile strength on wet strips 25.4 mm wide after a 20-minute soak in 6% sodium hydroxide.

Absorbency of the sheet was also measured, this being measured as the time taken for water to climb 25.4 mm up a vertical strip of the peper. The greater absorbency, the less time it would take to climb the sheet.

Of course, the test actually measures the absorbency of the sheet in the plane of the sheet, whereas in the production of casing tubes by passing a tube of casing paper through a caustic viscose solution, it is the absorbency in the direction perpendicular to the plane of the sheet that is important. However, it is postulated that the cited test correlates well with the absorbency in this direction. The penetration of an aqueous solution through a web—in whatever direction—is due to the same mechanism, i.e. capillary action, which in turn depends on the wettability of the capillary walls. It is furthermore thought that the wettability of the capillary walls may change with time in treated webs, particularly in the prior art viscose-treated webs. Thus, the "water climb" test was made on samples shortly after their production and also on samples that had been aged for three months.

The formulations used are shown below:

---

1. Standard Viscose

Viscose solution containing 1.75% cellulose.
Regenerated with sulphuric acid at a concentration of 0.4 Normal.

-continued

| 2. | Formulation A | Formulation B |
|---|---|---|
| Water (liters) | 492.1 (37.8° C.) | 492.1 (37.8° C.) |
| Natrasol 250L (kg) | 12 | 12 |
| Mix Time (mins) | 30 | 30 |
| Volume Make Up (liters) | To 613.2 | To 613.2 |
| Kymene 557 (liters) | 60.6 | 60.6 |
| Mix Time (mins) | 5 | 5 |
| Polymin P (liters) | 5.46 | 2.73 |
| Mix Time (mins) | 10 | 10 |
| Volume Make up (liters) | To 681.4 | To 681.4 |

The results are shown in the table below.

TABLE 1

| Properties | Units | Standard Viscose | Formulation A | Formulation B |
|---|---|---|---|---|
| Sheet weight | gsm | 27.1 | 27.9 | 27.7 |
| MD Dry Tensiles | gm/25.4mm | 4366 | 4766 | 4404 |
| MD Wet Tensiles | gm/25.4mm | 940 | 738 | 590 |
| Dry Elongation | % | 3.2 | 2.16 | 2.5 |
| Dry Toughness | cm/gm/sq.cm | 95 | 85 | 75 |
| Wet Elongation | % | 4.8 | 2.7 | 2.1 |
| Wet Toughness | cm/gm/sq.cm | 29 | 13 | 8.8 |
| Porosity | l/min | 208 | 254 | 241 |
| Burst | kg/sq.cm | 1.69 | 1.23 | 1.34 |
| MD Caustic Tensile | gm/25.4mm | 270 | 610 | 495 |
| 25.4mm Water Climb | secs. | 10 | 8.5 | 6.0 |
| 25.4mm Water Climb after 3 months | secs. | 20 | 8.5 | 6.0 |

From the table of results, one can draw the following conclusions:

The chemical formulations consisting of polyamideepichlorohydrin resin, polyethylene-imine and hydroxy ethyl cellulose had significantly increased the alkaline tensile compared with the standard sheet.

The same chemical formulation had also increased the water absorbency compared with the standard, after aging.

EXAMPLE 2

Handsheets of a typical tea bag base furnish, of defibred abaca and softwood, were produced to give untreated sheets at a basis weight (weight per unit area) of 34 gsm. (The value of the basis weight of the laboratory handsheets is not itself of significance; however, all the experimental results are relative to this basis weight in order to permit direct comparison.)

Sheets of said paper were saturated with an aqueous liquor containing both Kymene 557 (the trade name of a polyamide-epichlorohydrin resin marketed by Hercules Powder Company) and CMC to provide a total weight pick up of 1.5% on a dry basis. This simulated, on a laboratory scale, one of the prior art treatments discussed hereinbefore.

The treated webs were dried and then tested for their wet tensile strength and their alkaline wet tensile strength. The wet tensile strength was measured on strips of paper cut to a 15 mm width and saturated with water. The alkaline wet tensile strength was measured on strips of paper, 15 mm wide, saturated with 1% solution of sodium hydroxide. The results obtained were regarded as the standard and subsequent results from different treatments were compared to the standard.

Further untreated handsheets, as described above, were saturated with an aqueous liquor containing Kymeme 557, HEC and Polymin SN (the trade name of a polyethylene imine copolymer marketed by BASF, Germany). The sheets were dried to give treated paper sheets in accordance with this invention at chemical pick up levels of 2.25% and 0.65% by weight on a dry basis. The treated paper was tested for wet tensile strength and alkaline wet tensile strength, in the manner described above.

The results (all corrected to a handsheet basis weight of 34 gsm) are given in Table 2 below, which also specifies the ratio (by weight) of the various treating agents (as solids) used in each test. In the first three sheets reported in Table 2 the amount of Kymene is maintained constant in order to exemplify the effect of the other treating materials.

The tea bag papers according to the invention were tested to determine whether they would impart an undesirable taste to beverages. The papers were found to be as good in this respect as the prior art papers containing just Kymene 557 and CMC.

EXAMPLE 3

Untreated tea bag paper was first treated with a 0.1% solids solution of Polymin P and then treated with a mixture of Kymene 557 and HEC in the ratio of 1:2.9. The total pick up of the various solids was approximately the same as in Example 1. This gave a certain improvement in the alkaline wet strength, although this improvement was not quite as great as that obtained in Example 2, as may be seen from the results given in Table 2.

The tea bag papers according to the invention were tested to determine whether they would impart an undesirable taste to beverages. The papers were found to be as good in this respect as the prior art papers containing just Kymene 557 and CMC.

TABLE 2

| | Base Handsheet + Kymene/CMC at a ratio of 1/8.8 | Base Handsheet + Kymene/HEC/ Polymin SN at a ratio of 1/8.8/5 | Base Handsheet + Kymene/HEC/ Polymin SN at a ratio of 1/2.9/1.67 | Base Handsheet treated according Example 3 |
|---|---|---|---|---|
| Alkaline Wet Tensiles gms/15 mm | 55 | 350 | 350 | 150 |
| | 70 | 215 | 275 | 135 |
| | 80 | 350 | 625 | 155 |
| | 100 | 245 | 400 | 160 |
| | 60 | | | 145 |
| | 80 | | | 180 |
| Average Value | 74 | 290 | 429 | 154 |
| Wet Tensiles gms/15 mm | 500 | 300 | 475 | 250 |
| | 600 | 320 | 450 | 300 |
| | 450 | 480 | 600 | 245 |
| | 450 | | 600 | 250 |

TABLE 2-continued

|  | Base Handsheet + Kymene/CMC at a ratio of 1/8.8 | Base Handsheet + Kymene/HEC/ Polymin SN at a ratio of 1/8.8/5 | Base Handsheet + Kymene/HEC/ Polymin SN at a ratio of 1/2.9/1.67 | Base Handsheet treated according Example 3 |
|---|---|---|---|---|
| Average Value | 517 | 388 | 531 | 269 |

EXAMPLE 4

Untreated tea bag paper having a basis weight of 12 gsm was obtained using a commercial paper-making machine (305 cm wide) operating at a constant speed of 200 meters per minute. The fibrous webs were treated with Kymene 557, HEC and Polymin SN, in the manner described in Example 2, and were tested for their alkaline wet tensile strength and wet tensile strength in both the machine direction (MD) and cross direction (CD).

The results are given in Table 3 below. Again the ratios by weight of the various treating agents (as solids) are specified. The table also shows the results obtained using standard prior art tea bag papers, one having a Kymene 557/CMC treatment and the other having a viscose treatment. The pickup of solids in these prior art papers was comparable to that of the paper according to the invention.

The papers were also tested, using a panel of expert tasters, in order to determine the taste that they would impart to beverages. Each sample was rated on a 1-5 scale, 1 indicating an absence of imparted taste (the ideal) and 5 indicating an intolerable taste. The paper treated according to this invention and the prior art Kymene/CMC-treated paper both scored an average of 1.5, whereas the viscose-treated paper had the less satisfactory average score of 2.5.

(iii) The alkali resistance (measured as the alkaline wet tensile strength) of tea bag paper increased as the proportion of Kymene 557 approached that of polyethylene imine and hydroxy ethyl cellulose.

Note: Polyethylene imine is also marketed in other forms, such as Polymin P. Polymin SN and Polymin P give similar results when used in the present invention.

EXAMPLE 5

Samples of untreated hemp base webs having a basis weight of 25 gsm. were treated with various treating agents and then tested for wet tensile strength and alkaline wet tensile strength after differing wet treatments with water and a 6% by weight aqueous sodium hydroxide solution.

The base web used was a pure abaca fibre water laid material obtained from a commercial production run used for the manufacture of casing paper. Such a paper was characterized by being virtually unmodified by treatments such as beating. Thus, the bonded areas of such a sheet prior to saturation with the treating agents was very small, with the result that the initial web was very weak.

The treating agents and the percent pick up of each agent on a dry basis is set forth in Table 4. The pick up was determined by weighing the wet impregnated base web before and after treating in a laboratory size press. Since the concentration of the testing solution was

TABLE 3

|  | Untreated Web Off Machine + Kymene/HEC/ Polymin SN at a ratio of 1/8.8/5 3.25 | | Untreated Web + Kymene/HEC/ Polymin SN at a ratio of 1/2.9/1.67 0.65 | | Untreated Web + Kymene/HEC/ Polymin SN at a ratio of 1/1.8/1 0.55 | | Untreated Web + Standard Kymene/CMC treatment 1.50 | | Untreated Web + Standard Viscose Treatment 1.75 | |
|---|---|---|---|---|---|---|---|---|---|---|
| Dry Pick Up (%) | M.D. | C.D. | M.D. | C.D. | M.D. | C.D. | M.D. | C.D. | M.D. | C.D. |
| Alkaline Wet Tensiles | 290 | 230 | 375 | 275 | 425 | 270 | 48 | 11 | 152 | 30 |
|  | 265 | 232 | 400 | 290 | 525 | 315 | 23 | 7 | 106 | 24 |
| gm/15 mm | 290 | 220 | 385 | 265 | 425 | 375 | 74 | 22.5 | 195 | 45 |
|  | 270 | 240 | 385 | 288 | 485 | 440 | 29 | 10 |  |  |
|  | 300 | 215 | 460 | 312 | 400 | 375 |  |  |  |  |
|  | 285 | 218 | 315 |  | 470 | 415 |  |  |  |  |
| Average Value | 283 | 225 | 286 | 286 | 455 | 365 | 43.5 | 12.6 | 151 | 33 |
| Wet Tensiles | 375 | 275 | 510 | 355 | 450 | 460 |  |  |  |  |
|  | 375 | 280 | 450 | 375 | 470 | 325 |  |  |  |  |
| gms/15 mm | 320 | 275 | 425 | 335 | 470 | 385 |  |  |  |  |
|  | 275 | 240 | 540 | 375 | 450 | 460 |  |  |  |  |
|  | 360 | 245 | 450 | 380 |  |  |  |  |  |  |
|  | 400 | 215 | 470 | 280 | 425 |  |  |  |  |  |
| Average Value | 350 | 255 | 474 | 350 | 453 | 396 |  |  |  |  |

From the results of the foregoing Examples 2-4, the following conclusions could be drawn:

(i) The alkali resistance of tea bag paper can be substantially increased by treating the web with a hyddroxy ethyl cellulose/polyamide-epichlorohydrin/polyethylene imine mix when compared to a carboxy methyl cellulose/polyamide-epichlorohydrin mix.

(ii) It was also found that the treatment with Kymene 557/Polymin SN/HEC gave the same taste neutrality that is a feature of the prior art Kymene 557/CMC-treated paper.

known, a precise pick up value could be determined. All sheets were dried at 120° C. on a stream heated drum and cured at that temperature for a further five-minute period to bring about cross linking of the resins.

The wet tensile strength was determined using the standard wet tensile test with the treatment indicated. The alkaline spray test was conducted by placing a dry test specimen in the jaws of the Scott Tensile Tester and then lightly spraying the specimen with a 6% sodium hydroxide solution. The tensile test was then conducted as quickly as possible after the spraying. For the remaining alkaline tensile strength tests, the specimens were soaking in the 6% caustic solution for the periods indicated before being mounted in the Scott Tensile Tester.

The results are shown in Table 4.

clearly show that after this period had elapsed the alkaline wet strength of the web treated with the three component system of the invention provided more than a mere additive effect.

TABLE 4

| Sample | Treating Agent | Pick Up (%) | Wet Tensile (distilled water) | Spray | Alkaline Wet Tensile (6% NaOH solution) Soak Time | | | |
|---|---|---|---|---|---|---|---|---|
| | | | | | 2 min. | 5 min. | 10 min. | 20 min. |
| A | PEI (Polymin P) | 0.40 | 94.5 | 50.8 | 49.8 | 46.8 | 44.8 | 36.8 |
| B | PEI (Polymin P) | 0.15 | 68.6 | 44.7 | 47.7 | 41.7 | 41.0 | 36.8 |
| C | PAE (Kymene 557) | 1.07 | 186.6 | 74.7 | 43.9 | 41.1 | 44.8 | 24.3 |
| D | HEC (Natrasol 250 HR) | 0.56 | 0 | 0 | 0 | 0 | 0 | 0 |
| E | HEC plus PEI | 0.56 0.40 | 101.1 | 68.7 | 55.3 | 49.6 | 51.5 | 53.4 |
| F | HEC plus PEI | 0.56 0.15 | 53.2 | 20.7 | 11.8 | 11.8 | 13.8 | 7.9 |
| G | HEC plus PAE | 0.56 1.07 | 150.0 | 122.3 | 75.3 | 52.7 | 67.7 | 60.2 |
| H | PEI plus PAE | 0.40 1.07 | 192.1 | 111.6 | 113.2 | 114.2 | 103.1 | 107.1 |
| I | PEI plus PAE | 0.15 1.07 | 208.9 | 132.9 | 110.1 | 102.5 | 98.8 | 96.8 |
| J | PEI plus PAE plus HEC | 0.40 1.07 0.56 | 268.9 | 199.2 | 159.3 | 149.4 | 149.4 | 139.1 |
| K | PEI plus PAE plus HEC | 0.15 1.07 0.56 | 236.8 | 170.5 | 161.0 | 132.6 | 142.0 | 127.5 |

From the results shown in Table 4, the following conclusions can be drawn.

(i) The combination of hydroxyethyl cellulose (HEC), a polyamide-epichlorohydrin resin (PAE) and a polyethylene imine (PEI) produced a far greater alkaline wet strength than the individual agents used alone, in equivalent quantities. This demonstrates the surprising synergistic effect of the ternary treatment in accordance with the present invention.

(ii) Increasing the exposure time of the web to caustic solutions significantly decreases the tensile strength of the web.

(iii) HEC is completely unsuitable on its own as an alkaline wet strength agent.

(iv) PAE and PEI each perform poorly on their own as alkaline wet strength agents.

The last conclusion seems, at first, to be contradictory to the results shown in Table III of U.S. Pat. 3,484,356, to which reference was made earlier. However, it is probable that the paper web used in the aforesaid U.S. patent was itself intrinsically stronger than the paper used in the present example, which as stated above was very weak, since this showed more clearly the effect due to the various treating agents.

More importantly, there is no indication in the U.S. Patent that the test webs were soaked in the aqueous caustic solution for any longer than was necessary completely to wet the webs before testing them. Thus, very little time had elapsed in which the alkali could disrupt the binder. It is our experience, as confirmed in Table 4, that the alkaline wet strength of a fibrous web, as is currently used for casing paper, diminishes with time, presumably as the disruption of the binder by the alkali gradually proceeds.

For this reason, the alkaline wet tensile strengths were measured on samples that had been soaked in the alkaline solution for up to 20 minutes; after this period little further change in the alkaline wet tensile occurs. It is known that at least five minutes and, more likely, twenty minutes are the critical time scales for alkaline exposure in casing making operations. The results Our findings regarding PAE are corroborated by literature issued by Hercules Powder Company, who are leading manufacturers of polyamine-epichlorohydrin resins for the wet-strengthening of papers. They suggest that to reclaim such paper for re-use, one should add an alkali such as caustic soda in order to destroy the wet-strength of PAE treated material.

EXAMPLE 6

Samples of paper were treated with various agents in the manner described in Example 5, except that the total pick up of solids during the treatment was 6% on a dry-on-dry basis. This is the level that might be expected in the commercial treatment of paper webs with wet-strength agents or the like. The dry tensile amd alkaline wet tensile strengths were measured (the latter being measured only after soaking the sample for 20 minutes in 6% aqueous NaOH).

The treating agents were as follows:
A : HEC/Polymin P (weight ration 1:1)
B : Kymene 557/Polymin P (weight ratio 1:1)
C : HEC/Kymene 557/Polymin P (weight ratio 1:1:1)
D : HEC/Kymene 557/Polymin P (weight ratio 5:2:1)

The results are shown below in Table 5.

Table 5

| | Dry Tensile (g/25mm) | Alkaline Tensile (g/25mm) |
|---|---|---|
| Untreated Control | 1,250 | 0 |
| A | 3,200 | 331 |
| B | 2,550 | 463 |
| C | 3,000 | 500 |
| D | 3,300 | 531 |

As can be seen from the above table, the ternary mixture according to the invention imparted a significantly higher alkaline wet strength to the web than the tested binary mixtures. It will be noted that, assuming uniform pick up, composition B with 3% pick up of each of the known wet-strength agents Kymene 557 and Polymin P still gives a lower alkaline wet strength than composition C, with the equivalent of only a 2% pick up of each of these two agents. (As shown in Example 5, HEC by itself is unsuitable as an alkaline wet-strength agent.) The superiority of the invention is even more marked in the case of composition D, which has even lower amounts of Kymene 557 and Polymin P.

It should also be noted that the high levels of Kymene 557 and Polymin P in the web treated with composition B may, in some circumstances, exceed the permitted levels. Thus, the ternary system used in the present invention is especially advantageous.

As will be apparent to persons skilled in the art, various modifications, adaptations and variations of the foregoing specific disclosure can be made without departing from the teachings of the present invention.

We claim:

1. A process for the production of absorbent fibrous webs of improved alkaline wet tensile strength comprising the steps of forming a fibrous web material, treating the fibers of the web material with an aqueous solution of a water-soluble cationic, thermosetting, polyamide or polyamine epihalohydrin-containing resin to provide in the web about 0.05% to 4.0% by weight of said resin on a dry weight basis, treating the fibers of the web material with an aqueous solution of a non-viscose film-forming polymer material containing a hydroxyl group to provide in the web about 0.5% to 8.0% by weight of said film-forming material on a dry weight basis and treating the fibers of the web material with an aqueous solution of a polyalkylene imine polymer to provide in the web about 0.05% to 2.0% by weight of said polymer on a dry weight basis.

2. The process of claim 1 wherein the water-soluble cationic, thermosetting epihalohydrin-containing resin, the non-viscose film-forming material and the polyalkylene imine polymer are applied to the fibers after the formation of the web.

3. The process of claim 1 wherein the water-soluble cationic, thermosetting epihalohydrin-containing resin, the non-viscose film-forming material and the polyalkylene imine polymer are added to the fiber slurry prior to the formation of the web.

4. The process of claim 1 wherein the water-soluble cationic, thermosetting, epihalohydrin-containing resin, the non-viscose film-forming material and the polyalkylene imine polymer are applied to the fibers simultaneously.

5. The process of claim 1 wherein the film-forming material is hydroxy ethyl cellulose.

6. The process of claim 1 wherein the cationic, thermosetting resin is an epichlorohydrin-containing resin.

7. The process of claim 6 wherein the cationic, thermosetting, epihalohydrin-containing resin is a polyamide-epichlorohydrin resin.

8. The process of claim 1 wherein the polyalkylene imine polymer is selected from the group consisting of polyethylene imine and copolymers thereof.

9. The process of claim 1 wherein the treating agents are applied in amounts sufficient to provide, on a dry weight basis, 1% to 2.5% of the epihalohydrin-containing resin, 0.5% to 5% of the film-forming material and 0.1% to 0.8% of the polyalkylene imine polymer.

10. The process of claim 1 wherein the treating agents are applied in amounts sufficient to provide, on a dry weight basis, 0.05% to 1.0% of the epihalohydrin-containing resin, 0.1% to 5% of the film-forming material and 0.05% to 1.0% of the polyalkylene imine polymer.

11. The process of claim 10 wherein the treating agents are applied in amounts sufficient to provide, on a dry weight basis, 0.1% to 0.5% of the epihalohydrin-containing resin, 0.3% to 3.0% of the film-forming material and 0.1% to 0.8% of the polyalkylene imine polymer.

12. A water absorbent fibrous sheet material of improved alkaline wet tensile strength comprising a fibrous web containing about 0.05% to 4.0% by weight on a dry weight basis of a water-soluble cationic, thermosetting polyamide or polyamine epihalohydrin-containing resin, about 0.5% to 8.0% by weight on a dry weight basis of a non-viscose film-forming polymer material containing a hydroxyl group and about 0.5% to 8.0% by weight on a dry weight basis of a polyalkylene imine polymer.

13. The sheet material of claim 12 wherein the film-forming material is hydroxy ethyl cellulose.

14. The sheet material of claim 12 wherein the cationic, thermosetting epihalohydrin-containing resin is a polyamideepichlorohydrin resin.

15. The sheet material of claim 12 wherein the polyalkylene imine polymer is selected from the group consisting of polyethylene imine and copolymers thereof.

16. The process of claim 5 wherein the treating agents are applied in amounts sufficient to provide, on a dry weight basis, 1% to 2.5% of the epihalohydrin-containing resin, 0.5% to 5% of hydroxyethyl cellulose and 0.1% to 0.8% of the polyalklyene imine polymer.

* * * * *